United States Patent
Welk et al.

(10) Patent No.: US 6,834,957 B2
(45) Date of Patent: Dec. 28, 2004

(54) PROGRESSIVE SPECTACLE LENS HAVING A GENUINE SHORT PROGRESSION AREA

(75) Inventors: Andrea Welk, München (DE); Peter Baumbach, München (DE); Walter Haimeri, München (DE); Gregor Esser, München (DE); Helmut Altheimer, Lauchdorf (DE); Edda Wehner, Emmering (DE); Norbert Awrath, München (DE); Martin Zimmermann, Kleinberghofen (DE); Winfried Nikolaus, Haar (DE)

(73) Assignee: Rodenstock GmbH, Munich (DE)

( * ) Notice: Subject to any disclaimer, the term of this patent is extended or adjusted under 35 U.S.C. 154(b) by 0 days.

(21) Appl. No.: 10/380,349
(22) PCT Filed: Jul. 15, 2002
(86) PCT No.: PCT/DE02/02581
§ 371 (c)(1),
(2), (4) Date: Sep. 9, 2003
(87) PCT Pub. No.: WO03/007054
PCT Pub. Date: Jan. 23, 2003

(65) Prior Publication Data
US 2004/0027678 A1 Feb. 12, 2004

(30) Foreign Application Priority Data
Jul. 13, 2001 (DE) .......................... 101 33 617

(51) Int. Cl.$^7$ ................................. G02C 7/06
(52) U.S. Cl. ....................................... 351/169
(58) Field of Search .................................. 351/168–172

(56) References Cited

U.S. PATENT DOCUMENTS 6,142,627 A 11/2000 Winthrop ..................... 351/169

FOREIGN PATENT DOCUMENTS

EP 0911672 4/1999

OTHER PUBLICATIONS

S. Morgenstern, "Short Corridor Progressives: Lenses for the New Millenium" Visioncareproducts.com, Online, Jan. 2001–Feb. 2001.

Primary Examiner—Scott J. Sugarman
(74) Attorney, Agent, or Firm—Crowell & Moring LLP

(57) ABSTRACT

A progressive power spectacle lens in which a progressive length is less than or equal to 12 mm and width of the distance portion in a horizontally meridian y=+7 mm in dependence on power and addition power is larger than the values given in the following Table:

| | Sph = | −6.0 dpt | −2.5 dpt | 0.5 dpt | 3.0 dpt | 5.0 dpt |
|---|---|---|---|---|---|---|
| Addition Power = 1.0 | | 47 mm | 55 mm | 60 mm | 60 mm | 60 mm |
| Addition Power = 2.0 | | 34 mm | 36 mm | 34 mm | 29 mm | 35 mm |
| Addition Power = 3.0. | | 26 mm | 27 mm | 25 mm | 22 mm | 23 mm |

16 Claims, 2 Drawing Sheets

Spectacle lens according to the invention, having a large width of the distance portion Spectacle lens according to the invention, having a small rise of the magnification at y = const. = 12 mm Conventional spectacle lens having a small width of the distance portion (Shamir Piccolo)

Spectacle lens according to the invention, having a large width of the distance portion Conventional spectacle lens having a large rise of the magnification at y = const. = 12 mm (Shamir Piccolo)

Spectacle lens according to the invention, having a small rise of the magnification at y = const. = 12 mm

PROGRESSIVE SPECTACLE LENS HAVING A GENUINE SHORT PROGRESSION AREA

BACKGROUND OF THE INVENTION

The invention relates to a progressive power spectacle lens with a true short progression.

Because smaller spectacle frames have become fashionable, many manufacturers are at present induced to offer progressive power spectacle lenses having a shortened progressive length.

However, there is no generally valid definition of the length of a progressive zone. An indication of a vertical distance between stamp-marked points, for example between a distance and near reference point or between a centration point and a near reference point, is not sufficient to characterize the progressive length of a progressive power lens because the stamped marking need not necessarily correlate with the "as worn" properties, and for many lenses does not correlate.

A lens with a short progressive length may be expected to have approximately the power needed for correcting a defect of vision at the centration point or at the distance reference point, and to attain the power needed for near viewing well within a lens rim of a frame. The frame should not pass across either the distance portion or the near portion; rather than this, both portions should be located within the frame.

Extensive wearing tests which were performed by the inventors have shown that spectacle wearers find it agreeable not having to lower the gaze excessively, for example when reading a book. Less raising of the head, for example when working with a computer, is generally felt to be more agreeable ergonomically.

This calls for defining the progressive length as follows:

The length of a progressive zone is the difference between the vertical coordinates of two points, the upper point of which is that point on or directly adjacent to the principal visual axis at which the power for approximately correcting a defect of distant vision is present (e.g. the distance centration point), and the lower point of which is that point on or directly adjacent to the principal visual axis at which, when the glance is lowered, the near power stipulated by a prescription is attained for the first time.

This definition provides a measure of the progressive length which is independent from arbitrary stamped markings and takes account of the wearing situation in which a spectacles wearer uses the spectacles.

On the basis of this definition, a product comparison of spectacle lenses on the market shows that the indications of generally 12–14 mm, as given by most manufacturers for the progressive lengths of their products, do not withstand a realistic examination. The only products having true progressive lengths of 12 mm or 13 mm are "Kodak Concise" brand and "Shamir Piccolo" brand, respectively.

The designing of a progressive power lens having a short progressive zone is beset by some problems. One of the main problems is the increase of the surface astigmatism in a lateral direction on the right-hand side and the left-hand side of the principal (visual) axis, which is substantially described by Minkwitz' Law. As the increase of the power value along the vertical direction becomes steeper, the increase of the surface astigmatism in the lateral direction becomes greater. Thus, the following tendency will apply:

As the progressive zone becomes shorter, the attained addition power being the same, it also becomes narrower. This large gradient of the central astigmatism is also accompanied by an increase of maximum astigmatism at the periphery, which reduces the optical quality at the periphery and also affects the optical properties in the region of the principal meridian.

SUMMARY OF THE INVENTION

It is an object of the present invention to provide a spectacle lens having a (true) short progression zone in the sense of the above definition, and having, despite this requirement, advantageous imaging properties and an acceptable dynamic performance.

The achievement of this object in accordance with the invention has been obtained by providing a progressive length less than or equal to 12 mm and a width of the distance in a horizontal meridian y=+7 mm in dependence on power and an addition power larger than certain values as will be set forth below.

According to the invention, the distance portion advantageously keeps the horizontal change of power in the wearing position as small as possible. With practically all known progressive power lenses the power in the distance region increases in the outward direction from the principal meridian. This increase tends to be large particularly with conventional products having a shortened progressive length. This troublesome increase can be significantly reduced with a suitable surface design.

With progressive power lenses the power at the distance reference point is attained, for example, in the vertex measurement position or in the wearing position. In the first case the lens then has in the wearing position a power which as a rule differs only slightly from that prescribed. When shifting the gaze horizontally, a spectacle wearer experiences too strong a positive power along the outside direction; so-called "fogging" occurs which is noticed and experienced by the spectacles wearer as being disturbing.

The widths of the distance portion depend on the power and the addition power of the progressive spectacle lens. As the addition power becomes greater, as a rule the widths of the distance portions become smaller.

Table 1 shows the widths of the distance portion of a progressive power lens according to the invention. Progressive power lenses (having a true short progression length) according to the state of the art generally have smaller widths of the distance portions. The coordinate system has been so chosen that in the wearing position the y axis extends vertically and the x axis extends horizontally.

TABLE 1

Distance Portion Widths at y = 7 mm in dependence on Power and Addition Power

| Sph = | −6.0 dpt | −2.5 dpt | 0.5 dpt | 3.0 dpt | 5.0 dpt |
|---|---|---|---|---|---|
| Addition Power = 1.0 | 47 mm | 55 mm | 60 mm | 60 mm | 60 mm |
| Addition Power = 2.0 | 34 mm | 36 mm | 34 mm | 29 mm | 35 mm |
| Addition Power = 3.0 | 26 mm | 27 mm | 25 mm | 22 mm | 23 mm |

The addition power and the spherical power in the distance portion (Sph) are given in diopters.

Along a horizontal meridian having the coordinate y=const.=7 mm, located 3 mm above the centration point and 1 mm below the distance reference point, the power of a progressive power lens according to the present invention differs substantially from the value prescribed for distance only very far on the outside, i.e. at large values of the horizontal coordinates.

The width of the distance portion along a given horizontal meridian is defined as the distance between the two points on the right-hand side and left-hand side of the principal meridian, at which the mean power exceeds the value of the spherical equivalent (sph+½ cyl) of the prescription value by 0.5 dpt.

According to the invention it is also possible to significantly reduce the dynamic distortion with a suitable design of the surface.

The magnification (in percent) is defined as being the quotient of the retinal image size with a spectacle lens and the retinal image size without a spectacle lens. From this the following generally known formula may be derived:

$$\Gamma = \frac{\tan w'}{\tan w}$$

in which w' is the angle of sight with the spectacle lens and w is the angle of sight without the spectacle lens.

For small values of power, the magnification along horizontal meridians in the near portion follows a characteristic W shaped course. On or close to the principal meridian the magnification has a local maximum. From this maximum it at first decreases towards the outside, passes through a minimum, and then again increases. For this, the lens need not be symmetrical to the principal line; in particular, the temporal minimum may have a lower value than the nasal minimum.

A progressive power lens according to the invention is distinct in that the magnification changes only little along horizontal meridian.

In accordance with the invention, the maximum rise of the magnification, i.e. the difference between the magnification at the maximum (on or close to the principal meridian) and at the lower of the two minima, serves as a further feature. This is illustrated in Table 2:

TABLE 2

Maximum Rise of the Magnification at y = −12 mm in dependence on Power and Addition Power for a Progressive Power Lens of the Invention

| | Sph = | −0.5 dpt | 0.5 dpt | 1.5 dpt |
|---|---|---|---|---|
| Addition Power = 1.0 | | 1.4% | 0.9% | 0.5% |
| Addition Power = 2.0 | | 2.6% | 2.5% | 2.2% |
| Addition Power = 3.0 | | 4.4% | 4.2% | 4.1% |

BRIEF DESCRIPTION OF THE DRAWINGS

In the following the invention will be described by way of example, without limitation of the general inventive concept, with the aid of embodiments with reference to the drawings to which attention is expressly drawn concerning the disclosure of all details of the invention not described more explicitly in the text and in which.

DESCRIPTION OF EXAMPLES OF EMBODIMENT

Figures 1A, 1B:
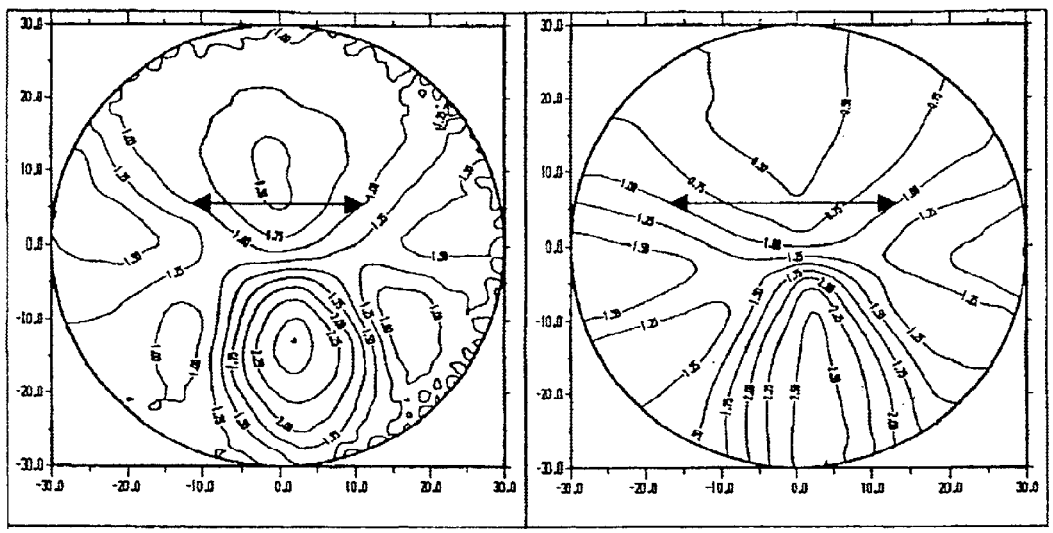
FIG. 1a is a conventional spectacle lens having a small width of the distance portion (Shamir Piccolo)
FIG. 1b is a spectacle lens according to the invention, having a large width of the distance portion.
Figures 2A, 2B:
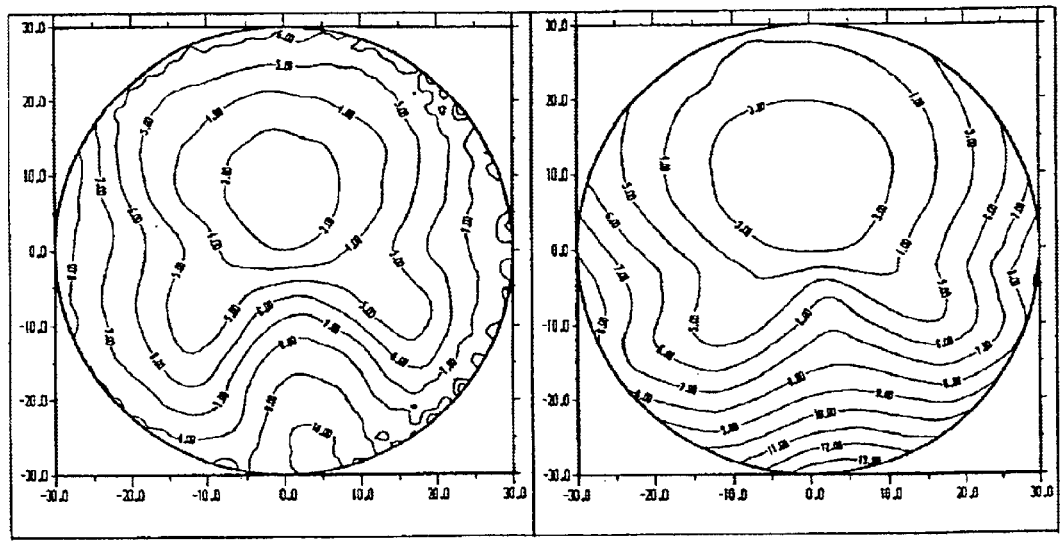
FIG. 2a is a conventional spectacle lens having a large rise of the magnification at y=const.=−12 mm (Shamir Piccolo)
FIG. 2b is a spectacle lens according to the invention, having a small rise of the magnification at y=const.=−12 mm.

The larger the widths of the distance portion are, the better is the progressive power lens. For most spectacle wearers, viewing at a distance is the most frequent viewing activity. Here a restriction of the field of view is experienced as being particularly troublesome. Restricted visual perception in the distance portion would represent an increased safety risk, for example in road traffic where peripheral viewing is of great importance. A large width of the distance portion makes it possible to look into a rear mirror without having to turn the head and thus reduces the period of time during which a driver cannot look straight ahead.

A change of magnification affects the magnitude of dynamic distortion. Wearing tests have shown that when the head is turned horizontally, space is perceived as being altogether more at rest. This advantageously affects also those viewing activities which are accompanied by combined head and body movements in space (climbing stairs for example).

The advantages obtained with the spectacle lens of the invention are illustrated in the accompanying drawing figures which are the general inventive concept.

What is claimed is:

1. Progressive power spectacle lens, comprising a first region configured for viewing at long distances; a second region configured for viewing at short distances; a progressive zone disposed between the first region and the second region in which a power of the spectacle lens increases from a value at a distance reference point located in the first region to a value at a near reference point located in the second region along a line curving towards a person's nose; and a progressive length which is less than or equal to 12 mm; wherein a width of the first region in a horizontal meridian y=+7 mm in dependence on power and addition power is larger than the values given in the following Table:

| | Sph = | −6.0 dpt | −2.5 dpt | 0.5 dpt | 3.0 dpt | 5.0 dpt |
|---|---|---|---|---|---|---|
| Addition Power = 1.0 | | 47 mm | 55 mm | 60 mm | 60 mm | 60 mm |
| Addition Power = 2.0 | | 34 mm | 36 mm | 34 mm | 29 mm | 35 mm |
| Addition Power = 3.0. | | 26 mm | 27 mm | 25 mm | 22 mm | 23 mm |

2. Progressive power spectacle lens according to clam 1, wherein the first region constitutes a distance portion for viewing to infinity.

3. Progressive power spectacle lens according to claim 1, wherein the second region constitutes a near portion for viewing at reading distances.

4. Progressive power spectacle lens according to claim 2, wherein the second region constitutes a near portion for viewing at reading distances.

5. Progressive power spectacle lens according to claim 1, wherein a maximum magnification rise in a horizontal meridian y=12 mm in dependence on power and addition power is smaller than the values given in the following Table:

|                      | Sph = | −0.5 dpt | 0.5 dpt | 1.5 dpt |
|----------------------|-------|----------|---------|---------|
| Addition Power = 1.0 |       | 1.4%     | 0.9%    | 0.5%    |
| Addition Power = 2.0 |       | 2.6%     | 2.5%    | 2.2%    |
| Addition Power = 3.0 |       | 4.4%     | 4.2%    | 4.1%.   |

6. Progressive power spectacle lens according to claim 5, wherein the first region constitutes a distance portion for viewing to infinity.

7. Progressive power spectacle lens according to claim 5, wherein the second region constitutes a near portion for viewing at reading distances.

8. Progressive power spectacle lens according to claim 6, wherein the second region constitutes a near portion for viewing at reading distances.

9. Progressive power spectacle lens according to claim 1, wherein, for powers and power additions intermediate between the Table values, corresponding linearly interpolated values apply.

10. Progressive power spectacle lens according to claim 9, wherein the first region constitutes a distance portion for viewing to infinity.

11. Progressive power spectacle lens according to claim 9, wherein the second region constitutes a near portion for viewing at reading distances.

12. Progressive power spectacle lens according to claim 10, wherein the second region constitutes a near portion for viewing at reading distances.

13. Progressive power spectacle lens according to claim 5, wherein for powers and power additions intermediate between values of each of the Tables, corresponding linearly interpolated values apply.

14. Progressive power spectacle lens according to claim 13, wherein the first region constitutes a distance portion for viewing to infinity.

15. Progressive power spectacle lens according to claim 13, wherein the second region constitutes a near portion for viewing at reading distances.

16. Progressive power spectacle lens according to claim 14, wherein the second region constitutes a near portion for viewing at reading distances.

* * * * *